May 16, 1967

C. B. SOHNS ET AL 3,320,393

ILLUMINATED SELECTOR SWITCH

Filed Nov. 15, 1965

INVENTORS,
Carl B. Sohns &
BY Josef Bierenfeld,
John H. Leonard,
their ATTORNEY.

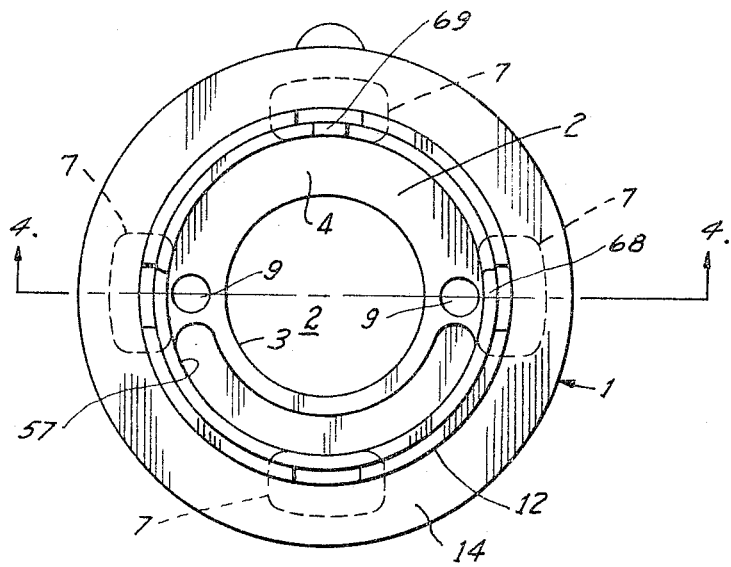
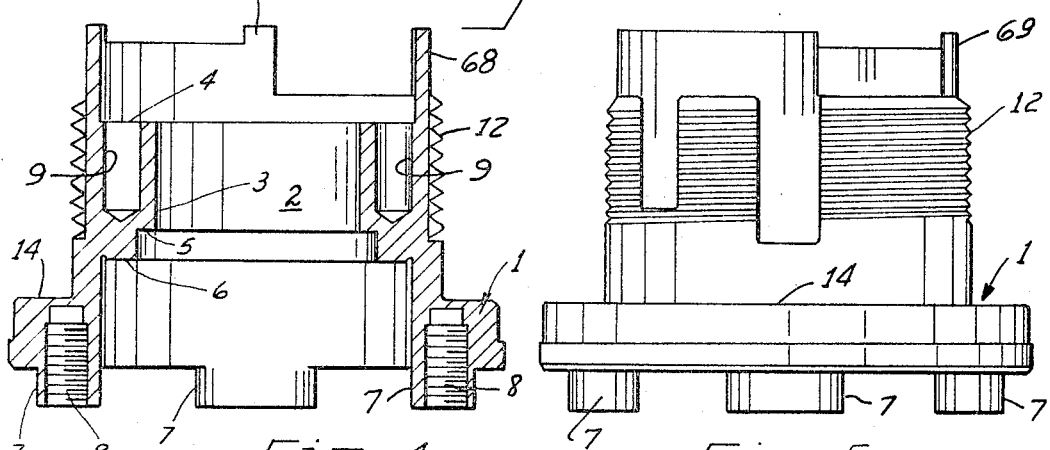
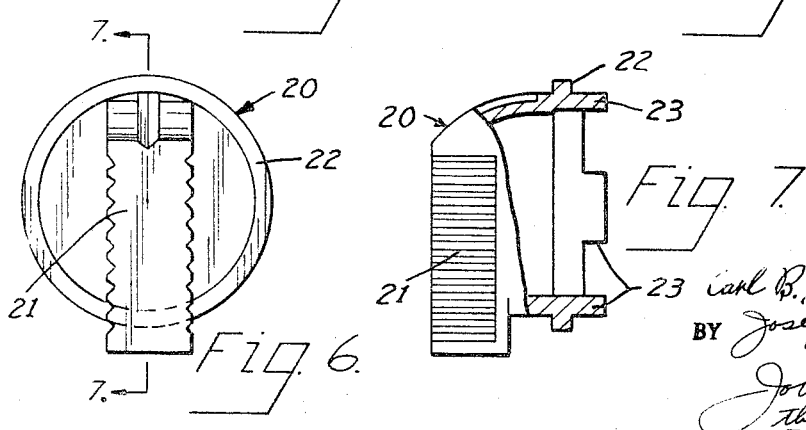

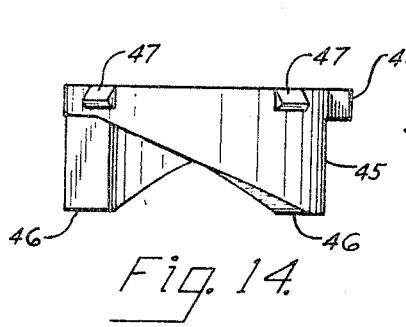
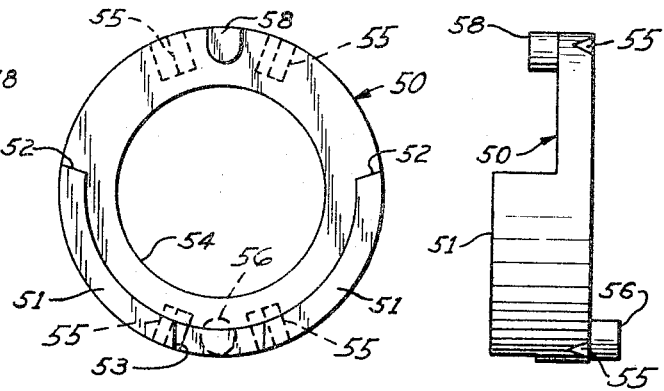
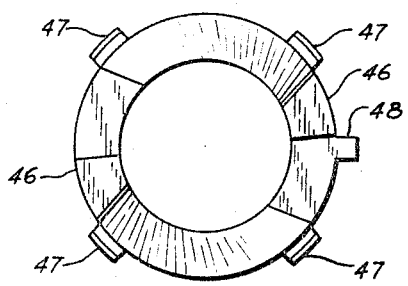
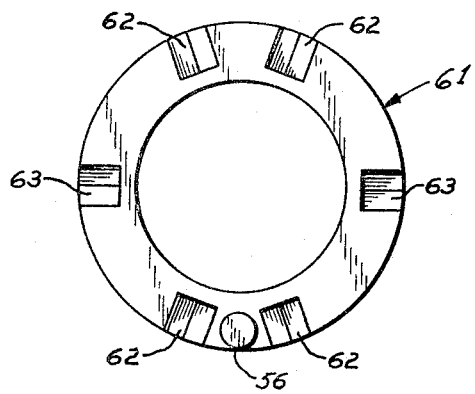
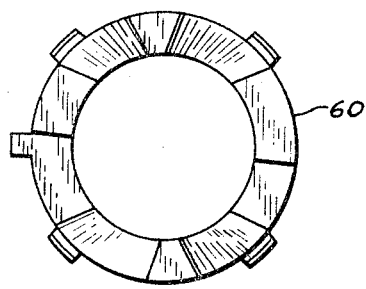
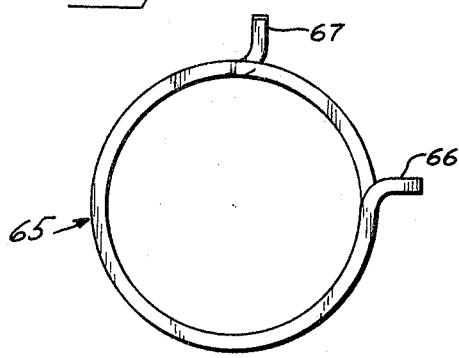

United States Patent Office 3,320,393
Patented May 16, 1967

3,320,393
ILLUMINATED SELECTOR SWITCH
Carl B. Sohns, Whitefish Bay, and Josef Bierenfeld, Shorewood, Wis., assignors to Square D Company, Park Ridge, Ill., a corporation of Michigan
Filed Nov. 15, 1965, Ser. No. 507,825
13 Claims. (Cl. 200—167)

This invention relates to selector switches, and particularly to selector switch characterized by having a number of related parts common to a line of switches, and a number of sets of interchangeable parts readily attachable to, and detachable from, certain of the common parts, selectively, to adopt the switch, with a minimum inventory of parts, for performing a very large selection of different switching arrangements.

More specifically the various sets of interchangeable parts are connectable to certain of the common parts generally comprising a base, a selector rotor, and a cam carrier, and each set of interchangeable parts comprising a cam and an adapter, the sets of interchangeable parts employed depending upon the particular type of switching operation selected.

A set of knobs is provided each of which may be used with any selected set of interchangeable parts. In this particular structure, the knobs are interchangeable so as to provide different colors or indicia for meeting the marking code requirements of a particular customer. They may be translucent so that the switch can be illuminated, or they may be opaque if illumination is not desired. They are essentially the same in all other respects. The common parts are so arranged that, without change, they can accommodate a light module for illuminating the selected knob, if desired.

The cam profiles are dependent upon the particular switching operations desired, and a very large number of different cams can be provided, and installed in a switch so that the cam is rotated by, and with, the knob. Consequently complementary adapters are provided for the cams, respectively, and each adaptor has detent means such that, upon the rotation of the cam, proper positions for effecting operation of the lobes of the particular cam are indicated, and the switch is held yieldably in the various operating positions to which it is thus rotated.

As an example, structurally identical knobs of seven different colors may be employed. Each of these knobs may be used with any selected set of interchangeable parts. Seven sets of interchangeable parts may be provided. Thus, with a limited number of parts, an extremely large number of possible switching arrangements to meet the requirements of a particular customer may be provided.

More specific objects relate to the manner in which the various parts of the switch are connected together, particularly to the manner in which the parts are adapted for snap-fastening engagement.

Still another object is to provide for an effective oil seal to prevent entrance of fluids into the interior of the switch adjacent to the knob.

Other objects and advantages will become apparent from the following description wherein reference is made to the drawings illustrating a preferred embodiment of the invention and wherein:

FIG. 3 is a top plan view of the base of the present switch;

FIG. 4 is a vertical, axial sectional view of the operator base as taken on line 4—4 in FIG. 3;

FIG. 5 is a right side elevation of the base shown in FIG. 3;

FIG. 6 is a top plan view of an operating knob of the switch of the present invention;

FIG. 7 is a right side elevation of the knob illustrated in FIG. 6, part thereof being shown in section, as indicated by the line 7—7 in FIG. 6;

FIG. 14 is a front elevation of a two position cam used in the present invention with the adaptor of FIGS. 11 and 12;

FIG. 15 is a bottom plan view of the cam illustrated in FIG. 14;

FIG. 16 is a top plan view of an indexing adaptor of the present invention, showing an adaptor for a two position selector switch;

FIG. 17 is a right side elevation of the indexing adaptor shown in FIG. 16;

FIG. 18 is a bottom plan view of the three position cam which is used in connection with the adaptor of FIG. 19;

FIG. 19 is a bottom plan view of the indexing adaptor for the three position cam; and FIG. 20 is a top plan view of a torsion spring which may be used in the present selector switch, if spring return to center position is desired.

Figure 1:
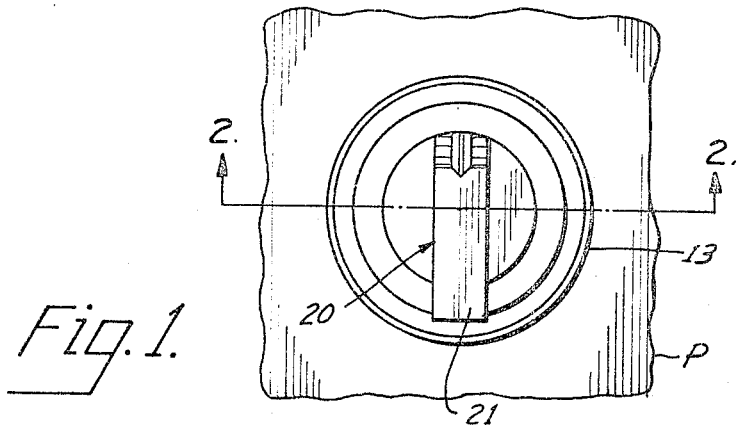
FIG. 1 is a top plan view of a selector switch embodying the principles of the present invention.

Referring to FIGS. 1 through 5, the selector switch comprises a metal operator base 1 having an axial passage 2 extending entirely therethrough. The passage is restricted by an internal annular rib 3 which terminates at its ends in spaced relation to the ends of the base, respectively, and provides an upwardly facing upper shoulder 4 and downwardly facing lower shoulders 5 and 6. At its lower end the base 1 is provided with circumferentially spaced bosses 7 which are internally threaded, as indicated at 8, for cooperation with bolts for securing the base to conventional switches S having operating plungers or push buttons B which, when the base 1 is mounted the switch body in position for operation by the selector switch, are engaged by cams of the selector switch.

The rib 3 is provided with a plurality of circumferentially spaced bores 9 in which are disposed suitable detent balls 10 which are urged toward the upper end of the base 1 by means of springs 11. The base is externally threaded, as indicated at 12, and accommodates the ring nut 13. The base 1 is received through a suitable opening in a panel P and has an external upwardly facing annular shoulder 14, and is drawn firmly into clamping relation to the panel by means of the nut 13 and shoulder 14. Suitable insulating and shock spacing and oil sealing gaskets 15 are interposed between the rear face of the panel P and the shoulder 14. A name plate 16 may be interposed between the ring nut 13 and the forward face of the panel P.

The operating base of the present switch is thus one which can be installed readily on a panel in operating position. The various operating parts of the switch can be installed as a factory subassembly before installation of the base on a panel. The parts can readily be removed from the base.

Figure 2:
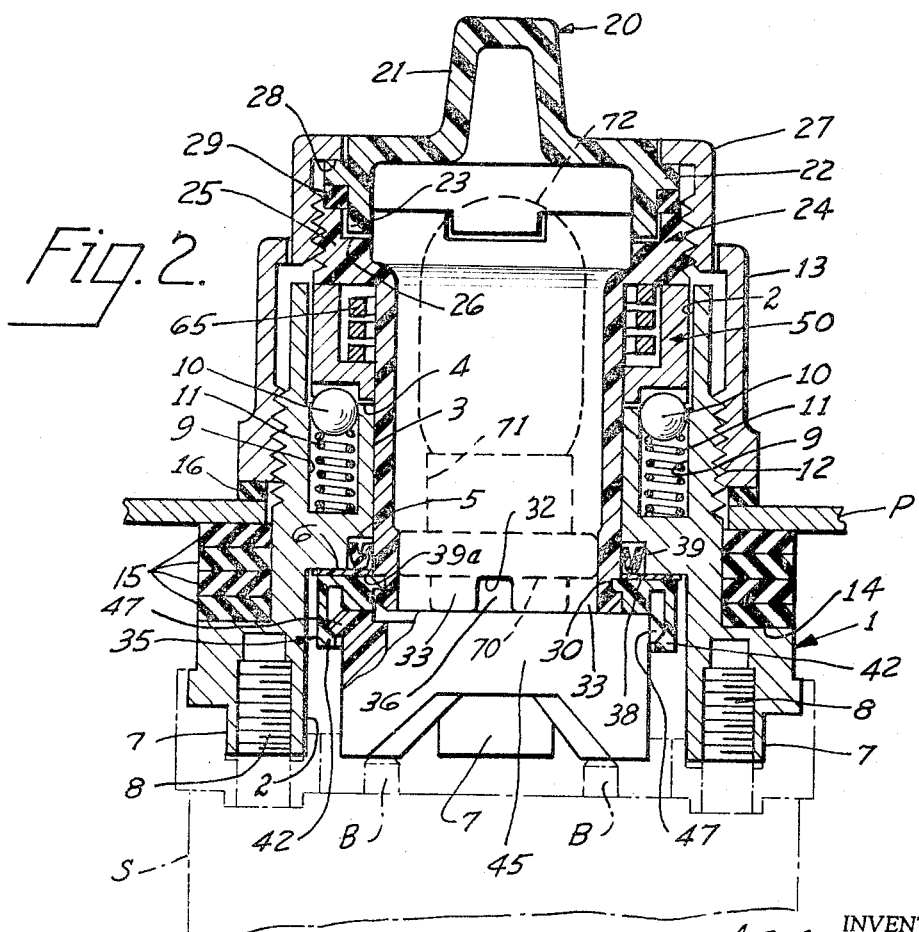
FIG. 2 is an enlarged vertical axial sectional view of the switch and supporting panel, and is taken on the line 2—2 in FIG. 1.
Figure 8:
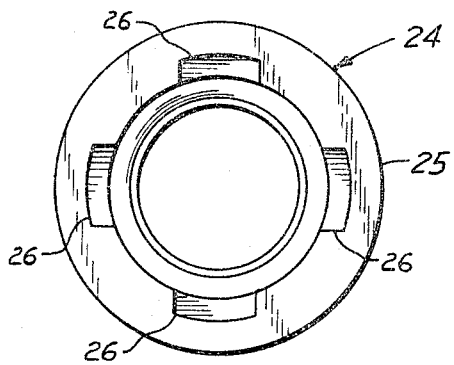
FIG. 8 is a top plan view of the selector rotor of the present invention.
Figure 9:
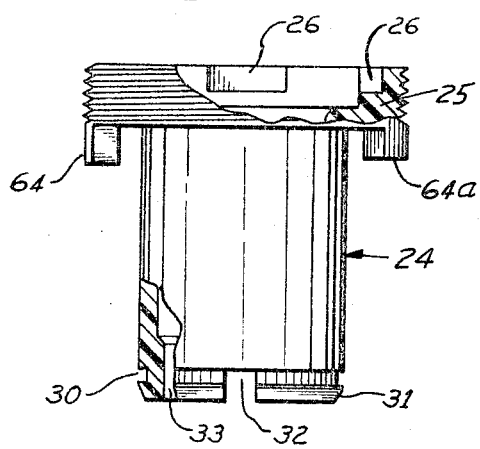
FIG. 9 is a front elevation of the selector rotor illustrated in FIG. 8, part thereof being shown in section for clearness in illustration.
Figure 10:
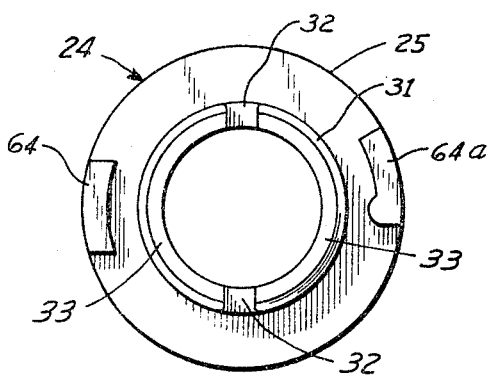
FIG. 10 is a bottom plan view of the selector rotor illustrated in FIGS. 8 and 9.
Figure 13:
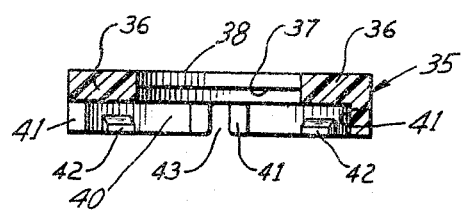
FIG. 13 is a vertical axial sectional view of the cam carrier, and is taken on the line 13—13 in FIG. 11.
Figure 11:
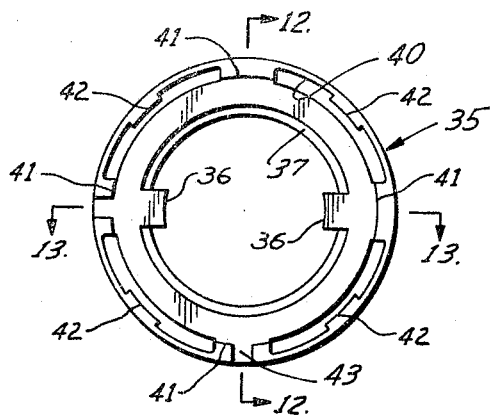
FIG. 11 is a bottom plan view of the cam carrier of the present invention.
Figure 12:
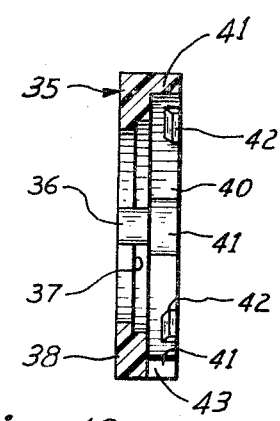
FIG. 12 is a vertical axial sectional view taken on line 12—12 in FIG. 11.

The moving parts of the switch include a knob 20 which, as illustrated in FIGS. 2, 6 and 7, has a finger-grip portion 21 and an outer radial flange 22 and dependent lugs 23.

The knob 20 is connected to a selector rotor 24 which, as illustrated in FIGS. 2 and 8 through 10, is generally in the form of a sleeve having at its upper end an externally threaded portion 25 of larger diameter than the remainder of the sleeve. The portion 25 has a plurality of upwardly open, circumferentially spaced notches 26 adjacent its inner periphery and arranged to receive snugly the lugs 23 of the knob 20 for connecting the selector rotor to the knob for rotation thereby.

The enlarged portion 25 of the rotor has depending lugs 64 and 64a which extend endwise of the rotor and are spaced outwardly, on the enlarged portion 25 from the smaller diameter portion adjacent thereto. Lugs 64 and 64a are adapted for connection with an indexing adaptor and for spring return of the operator parts, as will later be described. For securing the knob in fixed position axially on the upper end of the selector rotor, a suitable ring nut 27 is in threaded engagement with the upper end portion 25 of the selector rotor. The nut 27 is provided with an inwardly projecting radial shoulder 28 which faces the upper face of the flange 22 of the knob and thereby forces the flange 22 downwardly firmly against a suitable gasket 29 interposed between the upper end of the rotor portion 25 and the under face of the flange 22 of the knob. The gasket 29 forms an effective seal to prevent the infiltration of oil and moisture into the interior of the switch between the knob and the selector rotor. In the arrangement thus described, the knob 20 and the selector rotor 24 are secured firmly together for corotation about the axis of the central passage of the base 1.

The selector rotor 24 is composed of an electrical insulating material which is relatively stiff, but sufficiently resilient for snap-fastening engagement with a cam carrier, later to be described; for example, synthetic plastic material such as "Delrin."

The lower end of the rotor 24 is provided with an external, outwardly open, circumferential groove 30 and a nose portion 31 extending downwardly from the groove 30 to the lower end of the rotor. The nose portion 31 tapers downwardly for assisting in snap-fastening engagement of the rotor with a cam carrier, later to be described. Two diametrically opposite notches 32 are provided in the lower end portion of the rotor and extend from the plane of the upper side of the groove 30 entirely to the lower end of the rotor, thus dividing the lower end portion of the rotor 24 into two snap-fastening portions 33 which are adapted for snap-fastening engagement with a cam carrier 35, as illustrated in FIGS. 2 and 11 through 13.

The cam carrier 35 is in the form of an annulus having a pair of radially inwardly extending internal lugs 36 adapted to seat in the notches 32 of the rotor 24 for drivingly connecting the rotor and cam carrier for corotation about the axis of the rotor. At its upper end the cam carrier has snap-fastening means in the form of a radially inwardly extending connecting rib 37 which is so positioned and of sufficient internal diameter as to receive the tapered nose portion 31 of the rotor axially and upon forcing the cam carrier 35 axially upwardly of the rotor 24, to cause contraction of the companion snap-fastening means or elements 33 of the rotor 24 until the rib 37 is aligned with the groove 30 in the elements 33 of the rotor, whereupon the elements 33 self-restore themselves and effect a snap-fastening engagement of the cam carrier 35 and the rotor 24. The rib 37 and lugs 36 are so related that the lugs are accommodated in the notches 32 when the rib 37 is firmly seated in the groove 30.

The carrier 35 has on its upper face an annular surface 38 which extends outwardly beyond the rib 37 and is adapted to engage the shoulder 6 of the base 1 with operating clearance. A suitable V-shaped gasket 39 is interposed between the surface 38 and the shoulder 5 on the rib 3 of the base 1, thus providing an effective seal to prevent passage of the oil and moisture into the interior of the selector. If desired, a Teflon thrust bearing washer 39a may be interposed between the base and cam carrier.

At its lower end the carrier 35 has a large diameter portion 40 which has a plurality of radially inwardly extending positioning lugs 41. The lugs 41 engage, with operating clearance, the outer peripheral surface of a cam to be carried by the carrier, for holding the cam in coaxial relation with the carrier, as will later be described. The carrier also has a plurality of inwardly projecting lugs 42 which are spaced circumferentially from each other about the axis of the carrier 35. The lugs 42 are adapted for snap-fastening engagement with the cam.

In addition, the carrier 35 has a downwardly open notch 43 in its periphery which is adapted to receive a suitable lug on the cam for drivingly connecting the cam and the carrier for corotation when the cam is held in axial position on the carrier by the lugs 42.

The carrier 35 preferably is composed of electrical insulating material such as synthetic plastic, Delrin being one example.

Referring next to FIGS. 14 and 15, a cam 45, used in connection with the carrier 35, is illustrated.

The cam 45 is annular, having a central opening extending entirely therethrough coaxial with the central opening of the carrier 35 and rotor 24. The lower end of the cam has operating lobes 46 adapted to engage operating stems B with which the selector switch is associated and to move them axially of the rotor 24 and base 1 upon rotation of the cam 45 about the axis of the base 1. The cam 45 is preferably of a synthetic plastic, such as Teflon or Delrin, or a combination thereof. It is relatively rigid and wear resistant and slightly resilient. The cam is provided at its upper end with a plurality of circumferentially spaced, outwardly extending snap-fastening lugs 47, and with a radially outwardly extending driving lug 48. The cam 45 is arranged so that, when it is pressed upper end foremost against the lower end of the cam carrier 35, the lug 48 engages the notch 43 of the cam carrier, and the carrier lugs 42 and cam lugs 47 deflect sufficiently to effect a snap-fastening engagement between lugs 47 on the cam and the lugs 42 on the carrier for securing the upper end of the cam firmly against the downwardly exposed face of the carrier 35.

However, as heretofore mentioned, the selector switch is arranged so that each operating position of the cam is indicated by the detents 10. These positions necessarily are different for the different cams that may be used. Accordingly, in order to obtain the proper indication of the position of the knob 20, by the detents 10, an indexing adaptor 50 is provided which is complementary to an associated cam. The adaptor 50, as illustrated in FIGS. 2, 16 and 17, is in the form of a die cast metal annulus, having an external diameter such that the adaptor is received in coaxial relation in the upper end of the axial passage of the base 1 with operating clearance and is guided for rotation thereby in coaxial relation to the base.

The adaptor 50 is provided at one end with an upstanding circumferentially extending flange 51 which extends partway about the adaptor and has ends 52 spaced from each other circumferentially of the adaptor for accommodating therebetween, if desired, the ends of a return spring later to be described. The flange 51 also has a notch 53 which is open upwardly and is adapted to receive the lug 64 of the rotor 24 for connecting the rotor 24 and adaptor 50 for corotation. The upper end of the flange 51 of the adaptor 50 engages an underface portion of the portion 25 of the rotor 24.

The adaptor 50 has a central passage 54 which accommodates the smaller diameter portion of the rotor 24 with operating clearance. At its underface the adaptor 50 is provided with a plurality of downwardly open circumferentially detent receiving and indexing notches 55 which are in positions corresponding to the lobes of the cam to be associated with the adaptor, so as to yieldably indicate when the cam lobes are in full operating position, respectively. The adaptor may be provided on its underface with a limiting lug 56 which operates in a circumferentially extending upwardly open groove 57 in the base 1 for limiting the maximum circumferential movement in each direction of the knob, rotor, and adaptor. The adaptor, at its upper end carries an abutment lug 58 for cooperation with a return spring in those instances in which a return spring is to be used.

A different indexing adaptor is required for each type of operator action, depending upon whether two, three, or four positions are desired, and the specific type of spring return to be used. The cam used in each case depends on the number of positions for which it is desired.

For example, instead of the cam 45 and adaptor 50 above described, a three-position cam 60 and adaptor 61, as illustrated in FIGS. 18 and 19 may be provided. The cam 60 corresponds to the two position cam 45 except for difference in the number of lobes. The associated adaptor 61 corresponds to the adaptor 50 except that the adaptor 61 in addition to having notches 62 corresponding to the notches 55 of the adaptor 50, has additional notches 63 spaced circumferentially from notches 62 so that each of the operating lobe positions is indicated by the detent balls 10.

In some instances, it is desirable that the knob, rotor, indexing adaptor and cam be spring returned from the starting position. For such purposes, the lug 64a is provided on the lower face of the rotor 24, and a return spring 65, as illustrated in FIG. 20, is provided. The return spring may be in the form of a coil having abutment engaging end portions 66 and 67. Lugs 68 and 69 are provided at the upper end of the base 1.

It is to be noted that the lug 64a is sufficiently short axially relative to the lug 64 so that it clears the lug 58 on the upper face of the adaptor.

Thus, the spring may be disposed with the end 67 at the bottom and bearing against the one of the faces of the lug 69 which faces the lug 68 as well as the lug 58. The other end 66 is thus at the top and bears against the lug 64a of the rotor 24, as well as the other side of the lug 69 when the knob 20 is in a center position. In such case, the spring will be stressed by rotating the knob either clockwise or counterclockwise.

The lug 64a may be omitted. If the lug 64a is omitted, then the knob 20 will have to be returned manually when the operator has been moved counterclockwise, through it will remain spring biased to center position when the operator has been moved clockwise. Similarly, the lug 58 may be omitted, and if omitted, spring and manual return above described are reversed.

As mentioned, it is desirable in many instances that the selector switch be an illuminated switch.

In such case a light module may be disposed in the coaxial connecting central passages of the rotor 20 and carrier 35, with its base projecting into the central passage of the cam 45 and its bulb projecting into the interior cavity in the knob 20.

For example, as indicated in dotted lines in FIG. 2, the module may comprise a base 70 suitably mounted in the lower end of the rotor 24 above the level of the groove 30, and carrying a socket 71 in which is mounted a bulb 72. The base may contain suitable connections and leads for connecting the bulb to a source of power, the particular connection selected being dependent upon the use to which the switch is to be put.

As one example of the advantages of the present invention in providing for a large number of switching operations, with nine different types of adaptors, eight different types of cams, and two different types of selector rotors, a wide variety of two, three, and four position switches, with manual or spring return from right or left, and with or without spring biasing to center from various positions, can be obtained readily.

Having thus described our invention, we claim:

1. A selector switch operator comprising a base having a through lineal passage therein;
   rotor means mounted in the passage for rotation about the axis of the passage;
   an operating knob coaxial with, and connected to, one end of the rotor means for rotation therewith, and having a gripping portion disposed outwardly from the base beyond said one end of the base passage;
   cam means detachably connected to the opposite end of the rotor means in coaxial relation therewith and for rotation therewith, and having an operating surface facing outwardly endwise of the base in a direction away from the rotor means;
   an annular indexing adaptor detachably connected to the rotor means in surrounding relation thereto and for rotation therewith;
   complementary yieldable detent means carried by the base and adaptor, respectively, for yieldably arresting rotation of the adaptor in predetermined rotated positions of the rotor means and cam means relative to the base;
   said base being adapted for connection to switch means for holding the switch means in an operating position relative to the base wherein the switch means are operable by rotation of the cam means;
   and said rotor means and cam means being annular and having coaxial central passages, respectively, which are open at both ends so that a light module can be installed for illuminating the knob.

2. A selector switch operator according to claim 1 wherein said rotor means comprises an annular rotor,
   complementary rotary driving lug and notch means are provided on the rotor and knob, respectively, at said one end of the passage and are movable into and out of driving engagement by relative axial movement of the knob and rotor toward and away from each other, respectively; and
   connecting means are provided which connect detachably the rotor and knob and constrain them from relative axial movement away from each other when the complementary driving lug and notch means are in said driving engagement.

3. A selector switch operator according to claim 1 wherein said rotor means includes a rotor having an annular shoulder facing toward the knob;
   said knob has an annular flange with one end face facing toward, and aligned with, said annular shoulder, and with the other end face facing away from the shoulder;
   gasket means are provided and are disposed between said shoulder and one face of the flange;
   an internally threaded ring nut having an inwardly extending annular flange at one end is provided;
   the end of the rotor adjacent the shoulder is externally threaded; and
   the ring nut is in threaded engagement with the threads of the rotor and disposed with its flange in pressure engagement with said other face of the flange.

4. A selector switch operator according to claim 1 wherein said base has a first shoulder in the passage facing toward one end of the passage and has a second shoulder spaced from the first shoulder in a direction away from said one end of the passage and facing away from said one end;
   the rotor means comprises a rotor in and coaxial with the passage and having a first rotor shoulder means spaced from, and facing toward said first shoulder and having a second rotor shoulder means facing toward said one end of the passage, the cam means are in detachable snap-fastening engagement with said second rotor shoulder means and thereby constrain the rotor from removal axially out of said passage through said one end, detachably interengageable drive means are provided on the rotor and cam means and, upon snap-fastening the cam means on the rotor become operative to connect the rotor and cam means for corotation, the indexing adaptor is in the passage and is confined axially by, and between said first shoulder and first shoulder means of the rotor for rotation about said axis and constrains the rotor from removal from the passage through the opposite end of the lineal passage, said indexing adaptor is releasable for removal through said one end of the lineal passage by removal of the rotor through said one end, and is removable through said one end when so released;

the complementary detent means are exposed for interengagement at said first shoulder and shoulder means, for yieldably constraining the adaptor from rotation out of predetermined rotated positions, first complementary detachable means are provided on the adaptor and rotor, respectively, and detachably engageable with each other by axial movement of the rotor into said one end of the passage for drivingly connecting the adaptor and rotor for corotation;

an operating knob is provided and disposed adjacent said one end of the lineal passage;

second complementary detachable driving means are provided on the rotor and knob, respectively, and are detachably engageable with each other by movement of the knob in a direction axially of the passage toward the rotor for drivingly connecting the knob and rotor for corotation, and connecting means are provided and are connected to the rotor and knob and when the knob is connected to the rotor, rotatable therewith and constrains the knob from movement axially away from the rotor.

5. The structure according to claim 4 wherein the rotor and knob have axially aligned annular shoulders disposed radially outwardly from the complementary detachable driving means of the rotor and knob, and an annular gasket is disposed between said shoulders and is compressed therebetween by force exerted by said connecting means.

6. The structure according to claim 1 wherein said knob has an externally exposed translucent portion arranged for illuminating by a light module when a light module is disposed in the passages.

7. A structure according to claim 6 wherein a light module is disposed in the passages.

8. A selector switch operator comprising a base having a through lineal passage therein;

rotor means mounted in the passage for rotation about the axis of the passage;

an operating knob coaxial with, and connected to, one end of the rotor means for rotation therewith, and having a gripping portion disposed outwardly from the base beyond said one end of the base passage;

cam means detachably connected to the opposite end of the rotor means in coaxial relation therewith and for rotation therewith, and having an operating surface facing outwardly endwise of the base in a direction away from the rotor means;

an annular indexing adaptor detachably connected to the rotor means in surrounding relation thereto and for rotation therewith;

complementary yieldable detent means carried by the base and adaptor, respectively, for yieldably arresting rotation of the adaptor in predetermined rotated positions of the rotor means and cam means relative to base;

said base being adapted for connection to switch means for holding the switch means in an operating position relative to the base wherein the switch means are operable by rotation of the cam means, characterized in that said rotor means comprise an annular rotor;

complementary lug and notch means are on the end of the rotor opposite from the knob and on the cam means, respectively, and arranged to effect driving engagement and disengagement by relative axial movement of the rotor and cam means toward and away from each other, respectively;

complementary detachable snap fastening means detachably connecting said opposite end of the rotor and the cam means so as to constrain them from axial movement away from each other when their said lug and notch means are in driving engagement.

9. A selector switch operator according to claim 8 wherein the cam means comprise an annular cam carrier coaxial with the rotor and disposed at said opposite end of the rotor, and complementary interengageable lug and notch means on said carrier and rotor, respectively, and engageable and disengageable for effecting rotary driving engagement and disengagement, respectively, of the rotor and carrier by movement of the rotor and carrier axially toward and away from each other, respectively;

said snap fastening means comprise complementary snap fastening elements on said opposite end of the rotor and one end of the carrier detachably connecting the carrier and rotor and constraining them from axial movement relatively away from each other;

said cam means include an annular cam member and cam connecting means connecting the member to the carrier in fixed position relative thereto.

10. A selector switch operator according to claim 9 wherein said cam connecting means comprise complementary lug and notch means on the carrier and member, respectively, engageable and disengageable for effecting rotary driving engagement and disengagement, respectively, by movement of the member and carrier relatively toward and away from each other, respectively, and additional complementary snap fastening elements on the carrier and cam member, respectively, and detachably connecting the carrier and cam member while their complementary lug and notch means are connected, and constraining them from axial movement away from each other.

11. In a selector switch operator according to claim 9 wherein, at said opposite end of the lineal passage, the base has a counterbore coaxial with the lineal passage, said opposite end of the rotor extends into the counterbore and its peripheral wall defines therewith an annular channel opening toward said opposite end of the lineal passage;

a resilient sealing ring is disposed in said channel and bears against the defining walls thereof;

said rotor has an inwardly extending annular shoulder spaced from the ring in a direction away from said one end of the lineal passage and facing toward said one end;

said base has an internal annular shoulder disposed radially outwardly from the counterbore; and said carrier has inner end face portions bearing against said shoulders and sealing ring.

12. The structure according to claim 8 wherein the rotor is installed in the passage in the base by insertion axially into said base with said opposite end of the rotor foremost and is removable, axially from the passage, in the opposite direction;

said complementary detachable snap fastening means include a member disposed in the passage and having a snap fastening connection with the rotor at said opposite end of the rotor;

said member being engageable with means in the base and thereby constraining the rotor from removal axially from the passage in said opposite direction, and said member having means for a snap fastening connection with, and disconnection from, the cam means upon movement of the cam means axially relatively toward and away from the rotor, respectively, while the member remains connected to the rotor so as to constrain the rotor from removal from the base in said opposite direction independently of the connection and disconnection of the rotor and cam means.

13. A structure according to claim 12 wherein the rotor has a shoulder facing toward the cam means and the indexing adaptor is constrained from removal axially from the passage in a direction away from the cam means by engagement with said shoulder while the rotor is constrained from removal from said passage by said member.

References Cited by the Examiner
UNITED STATES PATENTS
3,193,653   7/1965   Cope _____ 200—166

ROBERT K. SCHAEFER, *Primary Examiner.*

H. O. JONES, *Assistant Examiner.*